United States Patent Office 2,731,474
Patented Jan. 17, 1956

2,731,474

HYDROXYTETRAHYDROCARBAZOLES

Robert Sidney Long, Bound Brook, N. J., assignor to American Cyanamid Company, New York, N. Y., a corporation of Maine No Drawing. Application Feb. 16, 1954,
Serial No. 410,729

4 Claims. (Cl. 260—315)

This invention relates to tetrahydrocarbazole compounds and to improved methods of preparing them.

A serious economic problem has been presented by the high cost of the para-chloranilide of 2-hydroxycarbazole-3-carboxylic acid. This compound is a good ice-color coupling component for azoic colors but hitherto its cost has been very high due to the fact that it has been synthesized by a multi-step expensive process starting from carbazole. Carbazole of the requisite purity for this synthesis is not cheap, either when it is obtained from the high boiling fraction of coal tar containing anthracene and phenanthrene or when it is prepared synthetically. The process used also involves a number of expensive steps starting out with the tetrasulfonation of carbazole followed by transformation of one of the sulfonic groups into hydroxy by fusion with caustic alkali. The other three sulfonic groups are then hydrolyzed off in an acid hydrolysis and the resulting hydroxycarbazole carbonated to produce the carboxylic acid. Unfortunately, this step does not result in producing the desired 2-hydroxycarbazole-3-carboxylic acid alone but on the contrary, it produces a mixture of the isomeric 1- and 3-carboxylic acids which present a serious problem in separation and add to the cost because of lowering the yield since the 1-carboxylic acid has no practical commercial use.

The present invention is directed to the preparation of derivatives of tetrahydrocarbazole which can be easily transformed into the corresponding carbazole derivatives and constitute a cheap source of 2-hydroxycarbazole-3-carboxylic acid para-chloranilide and other analogous compounds. The new compounds of the present invention are represented by the following formula:

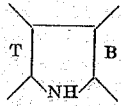

in which T stands for a tetrahydrocarbocyclic radical of the benzene or naphthalene series and B stands for a substituted benzene ring at least one of the substituents being hydroxy.

The compounds of the present invention can be produced readily by condensing a suitable hydroxy phenylhydrazine with cyclohexanone or cyclohexanone derivatives. This first produces a phenylhydrazone which then can be rearranged and simultaneously cyclized to form derivatives of tetrahydrocarbazoles in which the aromatic ring is substituted, at least one substituent being hydroxyl.

Several modifications of the process are possible, for example where it is desired to have a carboxylic acid substituent or a carboxyarylide substituent in the benzene ring, para-aminosalicylic acid is diazotized and converted into the 4-hydrazinosalicylic acid which is then reacted with cyclohexanone or a cyclohexanone derivative to produce a corresponding 2-hydroxy-3-carboxy-5,6,7,8-tetrahydrocarbazole. It is also possible to acylate the para-aminosalicylic acid before diazotizing for example by forming the acetyl derivative which is then converted into the corresponding para-chloranilide and the latter after deacylation is transformed into the hydrazine compound. Then when the condensation with cyclohexanone or its derivatives is carried out, the carboxylic acid arylide group is already present in the resulting tetrahydrocarbazole compound.

Another process involves the transformation of meta-aminophenol into meta-hydroxyphenylhydrazine, condensation with the cyclohexanone derivative and cyclization. This results in a mixture of isomeric hydroxy-tetrahydrocarbazoles which can be dehydrogenated, for example by means of palladium black at elevated temperatures. This dehydrogenation method is applicable to the other derivatives described above. The 4-hydroxy isomer which is obtained when meta-aminophenol is the starting material is a new compound and so far as is known, cannot be prepared by any other means. Some of the hydrazine intermediates are also new compounds; for example, 4-hydrazinosalicylic acid is not known and is important because it is the best material to use in one modification of the process for preparing the corresponding hydroxycarboxy-tetrahydrocarbazole which can then be used as a raw material for producing the desired 2-hydroxycarbazole-3-carboxylic acid para-chloranilide.

The reaction with the cyclohexanone compound to produce the hydrazone for cyclization is effected with any cyclohexanone derivative which has a free position ortho to the keto group and thus permits cyclization. Cyclohexanone itself is a most important starting material because it results in the production of a carbazole from which the desirable 3-carboxylic para-chloranilide can be produced. However, the present invention is not limited, either from its product or process aspects, to reactions with cyclohexanone itself and the products prepared thereby as it is equally applicable to other derivatives in which there is a free position ortho to the keto group. For example, an alkyl cyclohexanone such as methyl-cyclohexanone can be used to produce a corresponding methyl substituted tetrahydrocarbazole. It is also possible to employ fused ring derivatives of cyclohexanone such as tetralone which is benzocyclohexanone. The resulting carbazole, of course, has an additional fused ring and after oxidation results in a carbazole having a naphthalene group as well as a phenol ring.

The preparation of the hydrazines from the aminohydroxy compounds is effected by more or less standard reactions and it is an advantage of the present invention that neither the diazotization step nor the reduction step presents difficulties. It is also an advantage that it is not necessary to isolate the hydrazine compound before reaction with the cyclohexanone derivative. On the contrary the reaction mixture can be used as such and this presents the economic advantage of eliminating one step in the synthesis which the isolation of the hydrazine compound would involve.

The ring closure of the hydrazone produced in the first reaction step may be effected in various ways. In general, an acid medium should be employed and here considerable variation is possible. Thus, dilute sulfuric acid can be used, but it has been found that the optimum conditions for this step involve the use of a reaction medium comprising acetic acid and hydrochloric acid.

This invention will be illustrated in connection with the following specific examples in which the parts are by weight unless otherwise specified.

*Example 1*

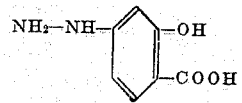

A mixture of 76.5 parts of 4-aminosalicylic acid, 175 parts of water, 115 parts of 20% sodium hydroxide, and 35 parts of sodium nitrite is added gradually with stirring at 0°–5° C. to 500 parts of 5 Normal hydrochloric acid. The mixture is stirred until diazotization is complete and is then added gradually to a slurry of 435 parts of sodium hydrosulfite and 205 parts of sodium acetate in 500 parts of water at 5° C. The mixture is stirred until the reaction is substantially complete. The light yellow product is separated by filtration and dissolved in dilute sodium carbonate solution. The solution is clarified and the product is acidified and made quite acid to form the hydrochloride. The precipitated hydrochloride is isolated by filtration and washing.

*Example 2*

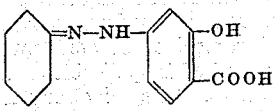

100.9 parts of the product of Example 1 is dissolved in 1600 parts of water at 70° C. The solution is clarified, if necessary, and 48.2 parts of cyclohexanone is added. The mixture is held at 60° C. until reaction is substantially complete. It is then cooled to 35° C. and the product is isolated by filtration and washing. Recrystallization from alcohol produces a relatively pure product which melts at 183° C. with decomposition.

*Example 3*

The diazotization of 4-amino salicylic acid and the reduction to the hydrazine is carried out by the process of Example 1. The crude press cake is slurried in about 1500 parts of water and made quite alkaline with sodium carbonate. The solution is acidified by the addition of hydrochloric acid with external cooling. The precipitated product is filtered and dissolved at 60° C. in 1600 parts of water. This solution is then clarified and held at 60° C. while 49.1 parts of cyclohexanone is added. The white slurry is stirred and allowed to cool to room temperature. The precipitated hydrazone is filtered and washed with water. The product is identical with that of Example 2.

*Example 4*

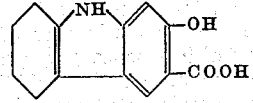

Ten parts of the product of Example 2 is slurried in 50 parts of glacial acetic acid previously saturated with hydrochloric acid. The slurry is stirred at 85° C. until the reaction is substantially complete. The reaction mixture is then drowned on 100 parts of ice and the resultant mixture is basified with sodium carbonate. Ammonia is evolved during this basification. The mixture is then filtered and the filtrate is acidified to precipitate 2-hydroxy-5,6,7,8-tetrahydrocarbazole-3-carboxylic acid melting at 230–232° C. with decomposition.

*Example 5*

0.525 part of the product of Example 2 is slurried in 20 parts of 10% sulfuric acid. The mixture is stirred at room temperature until most of the reaction has taken place. It is then heated to boiling until the reaction is substantially complete. The reaction mixture is then diluted with water and made alkaline with sodium carbonate. Some ammonia is liberated during the basification. The reaction mixture is filtered and the filtrate is acidified to isolate the product identical with that of Example 4.

*Example 6*

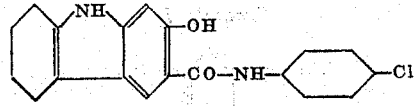

Eighty parts of the product of Example 4, 43 parts of toluene, and 4.85 parts of p-chloraniline is mixed and heated to 70° C. 2.08 parts of phosphorus trichloride is added. The mixture is then refluxed until the reaction is substantially complete. The mixture is then cooled and the precipitated p-chloranilide is isolated by filtration, washing, and drying. Extraction with an aqueous soda ash solution removes unreacted free acid and improves the purity of the product.

*Example 7*

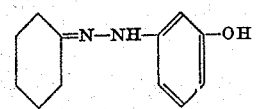

54.6 parts of meta-aminophenol is dissolved in 500 parts of 5 Normal hydrochloric acid and the mixture is cooled to 0° C. A solution of 35 parts of sodium nitrite in 50 parts of water is added gradually at 0° C.–30° C. The resultant diazo solution is then added to a slurry of 435 parts of sodium hydrosulfite and 206 parts of sodium acetate in 500 parts of water at 5°–10° C. The mixture is filtered and the filtrate is stirred while 49.1 parts of cyclohexanone is added. The mixture is then stirred until the reaction is substantially complete. Cooling to 10° C. precipitates the product which is isolated by filtration. The crude product is recrystallized from aqueous alcohol and gives a pure meta-hydroxyphenylhydrazone melting at 49° C.

*Example 8*

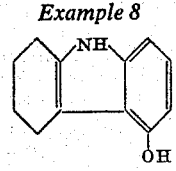

and

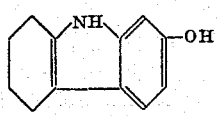

Five parts of the product of Example 7 is slurried in 25 parts of glacial acetic acid saturated with hydrogen chloride. The slurry is stirred until the reaction is substantially complete. The precipitated hydrochloride, mixed with ammonium chloride, is isolated by filtration and extracted with 16 parts by volume of glacial acetic acid at the boil. The mixture is filtered at room temperature to remove ammonium chloride and the filtrate is drowned in water. The precipitated free base is isolated by filtration. It melts at 130–137° C. The crude product is recrystallized from xylene which results in the production of a very pure sample of the 2 isomer melting at 162–163° C. The 4 isomer is present in the mother liquor from which it is readily isolated.

*Example 9*

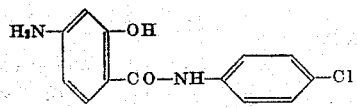

76.5 parts of p-aminosalicylic acid is dissolved in a solution of 106 parts of sodium carbonate in 500 parts of water. One hundred and two parts of acetic anhydride is added gradually. The temperature of the mixture tends to rise and a white crystalline product precipitates. The mixture is stirred until the reaction is substantially complete and then basified with 100 parts of 10% aqueous sodium carbonate solution. Twenty-six additional parts of acetic anhydride is added followed by 100 parts additional of 10% sodium carbonate solution and the mixture is stirred until it is certain that the reaction is complete. The mixture is then diluted with 300 parts of water and the resulting slurry is heated until a complete solution is obtained. Concentrated hydrochloric acid is added dropwise until the mixture is strongly acid. The white crystalline product is isolated by filtration and washing.

Ninety parts of acetyl amino salicyclic acid is slurried in 600 parts of toluene and the mixture is heated to 45° C. 64.5 parts p-chloraniline is added. The mixture is then heated to 70° C. and 27.7 parts of phosphorus trichloride is added gradually while holding the mixture at 70–80° C. The reaction mixture is then heated to reflux until the reaction is substantially complete. Cooling the reaction mixture precipitates the p-acetyl amino salicylic acid p-chloranilide which is isolated by filtration and extracted with 10% sodium carbonate solution to remove free acid. The crude product is then dissolved in sodium hydroxide solution and clarified and the purified product is isolated by acidification, filtering and washing.

One hundred and twenty-six parts of the above product is slurried in a solution of 18.2 parts of sodium hydroxide in 218 parts of water. The slurry is refluxed until the reaction is substantially complete. During the refluxing it is necessary to add an additional 18.2 parts of sodium hydroxide and 164 parts of water. The reaction mixture is then acidified with glacial acetic acid and the precipitated product is filtered and washed. It is purified by dissolving in concentrated hydrochloric acid, clarifying and basifying the filtrate. The purified solid is then slurried in 500 parts of alcohol and the slurry is heated until a solution is obtained. 37.8 parts of concentrated hydrochloric acid is added and the mixture is cooled. The yellow crystalline product is isolated by filtration and washing. It melts at 201–202° C.

*Example 10*

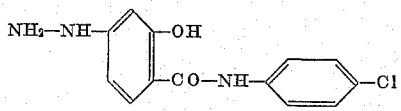

145.2 parts of the product of Example 9 is mixed with 222 parts of water and 127.5 parts of 5 Normal sodium hydroxide. A solution of 38.8 parts of sodium nitrite in 55.5 parts of water is added and the mixture is added gradually to a cold solution (0° C.) of hydrochloric acid in water (5 Normal). The diazo slurry thus formed is added gradually to a solution of 240 parts of sodium sulfite, 114 parts of sodium acetate in 1110 parts of water and held at 10° C. The mixture is then stirred while warming to room temperature until the reaction is substantially complete. The product is isolated by filtration and reslurried in water. Sodium hydroxide and charcoal are added and the mixture is clarified. The filtrate is acidified with glacial acetic acid and the resultant gelatinous precipitate is filtered and dried. The crude product is recrystallized from a solvent giving a pure product having a melting point of 198° C. with decomposition.

*Example 11*

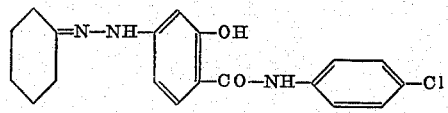

Five parts of the product of Example 10 is dissolved in 125 parts of alcohol and 1.98 parts of cyclohexanone is added. The mixture is refluxed until the reaction is substantially complete. The mixture is then cooled and 200 parts of water is added. The precipitated product is isolated by filtration and washing. The crude product melts at 212–215° C. When recrystallized from aqueous methanol a purified product is obtained melting at 228–229° C.

*Example 12*

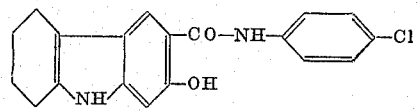

Ten parts of the product of Example 11 is added to 50 parts of glacial acetic acid saturated with hydrogen chloride. The mixture is heated to reflux until the reaction is substantially complete. It is then cooled and drowned in 200 parts of water. The precipitated product is isolated by filtration and washing. The crude product melts at 164–190° C. and on recrystallization from alcohol gives a product having a melting point of 182–198° C.

I claim:
1. A process of preparing 2-hydroxy-5,6,7,8-tetrahydrocarbazole-3-carboxy-p-chloranilide from 4-aminosalicylic acid which comprises (1) converting the 4-aminosalicylic acid into 4-hydrazinosalicylic acid by diazotizing the 4-aminosalicylic acid and reacting the diazo compound with sodium hydrosulfite in an aqueous medium to form 4-hydrazinosalicylic acid, (2) recovering the 4-hydrazinosalicylic acid so obtained, (3) converting the 4-hydrazinosalicylic acid into the cyclohexanone hydrazone thereof by reacting said 4-hydrazino-salicylic acid with cyclohexanone to form said hydrazone compound, (4) recovering the cyclohexanone-4-carboxy-3-hydroxyphenylhydrazone so obtained, (5) converting the said hydrazone compound into 2-hydroxy-5,6,7,8-tetrahydrocarbazole-3-carboxylic acid by heating said hydrazone compound in acidic medium to effect rearrangement and cyclization and form 2-hydroxy-5,6,7,8-tetrahydrocarbazole-3-carboxylic acid, (6) recovering the 2-hydroxy-5,6,7,8-tetrahydrocarbazole-3-carboxylic acid so obtained, (7) converting the 2-hydroxy-5,6,7,8-tetrahydrocarbazole-3-carboxylic acid into the p-chloranilide thereof by reacting said carboxylic acid with p-chlor-aniline and (8) recovering the 2-hydroxy-5,6,7,8-tetrahydrocarbazole-3-carboxy-p-chloranilide so obtained.

2. 4-hydrazinosalicylic acid.

3. 2 - hydroxy-5,6,7,8-tetrahydrocarbazole-3-carboxylic acid.

4. 2 - hydroxy - 5,6,7,8-tetrahydrocarbazole-3-carboxy-p-chloranilide.

References Cited in the file of this patent

UNITED STATES PATENTS

| | | |
|---|---|---|
| 1,999,341 | Muth | Apr. 30, 1935 |
| 2,057,948 | Herdieckerhoff | Oct. 20, 1936 |
| 2,071,702 | Muth | Feb. 23, 1937 |
| 2,144,704 | Muth | Jan. 24, 1939 |
| 2,161,524 | Morschel et al. | June 6, 1939 |

FOREIGN PATENTS

| | | |
|---|---|---|
| 645,880 | Germany | June 9, 1937 |

OTHER REFERENCES

Beilstein (4th ed.), Band 21, main work, page 121, 1st supplement, page 227.

Chem. Reviews 40, pp. 359–380 (1947).